United States Patent [19]

Miles

[11] Patent Number: 4,988,190

[45] Date of Patent: Jan. 29, 1991

[54] ABSORPTION LINE FILTER WINDOW AND METHOD FOR VELOCITY MEASUREMENTS BY LIGHT SCATTERING

[75] Inventor: Richard B. Miles, Princeton, N.J.

[73] Assignee: Trustees of Princeton University, Princeton, N.J.

[21] Appl. No.: 581,408

[22] Filed: Sep. 11, 1990

Related U.S. Application Data

[63] Continuation-in-part of Ser. No. 461,230, Jan. 5, 1990, abandoned.

[51] Int. Cl.⁵ .............................................. G01P 3/36
[52] U.S. Cl. ..................................... 356/28; 356/28.5
[58] Field of Search .................................. 356/28, 28.5

[56] References Cited

U.S. PATENT DOCUMENTS

| | | | |
|---|---|---|---|
| 4,334,779 | 6/1982 | Domey et al. | 356/358 |
| 4,537,503 | 8/1985 | Liu | 356/28.5 |
| 4,585,341 | 4/1986 | Woodfield | 356/28.5 |
| 4,624,561 | 11/1986 | Exton | 356/28.5 |
| 4,715,707 | 12/1987 | Reynolds et al. | 356/28.5 |
| 4,822,164 | 4/1989 | Breen | 356/28.5 |
| 4,919,536 | 4/1990 | Komine | 356/28.5 |

FOREIGN PATENT DOCUMENTS

P2500376 7/1976 Fed. Rep. of Germany ............ 356/

OTHER PUBLICATIONS

Adrian, "Engineering Applications of Particle Imaging Velocimeters", 58/L.I.A., vol. 68, ICALEO (1989).
Gelbwachs, IEEE J. Quant., Electronics, vol. 24, p. 1268 (1988).
Korevaar, Rivers, and Liu, "Space Sensing Communications and Networking", SPIE vol. 1059, p. 111 (1989).
Lehmann, S. A. Lee, and She, Optics Letters, vol. 11, pp. 563-565, (1986).
Matveev, "Atomic Resonance Spectrometers and Filters (Review)", Translated from Zhurnal Prikladnoi Spektroskopii, vol. 46, No. 3, pp. 359-375, Mar., 1987 (original article submitted Jun. 23, 1986).
Shimizu, Lee, She, Appl. Opt., "High Spectral Resolution Lidar System with Atomic Blocking Filters for Measuring Atmospheric Parameters", vol. 22, p. 1373 (1983).
M. Smith, Smits, R. Miles, Optics Letters, vol. 14, p. 916 (1989).
Van Zee, Blankespoor, Zwier, Chemical Physics Letters, vol. 158, p. 306 (1989).
Yip, Fourguette, M. B. Long, Applied Optics, vol. 25, p. 3919 (1986).

Primary Examiner—Mark Hellner
Attorney, Agent, or Firm—Kenneth Watov

[57] ABSTRACT

Velocity is measured by observing velocity-related frequency shifts in light scattered from moving air molecules or particles suspended in moving air, by passing the scattered light through an absorption line filter window gas cell with a notch type attenuation profile as a function of frequency. The scattering region is illuminated with a narrow linewidth light source coincident in frequency with a strong absorption line of an absorption line filter, whereby light scattered from stationary air molecules or particles is passed into the filter and a portion of that light falling within the strongly attenuated region is absorbed. As the velocity of the molecules or particles in the scattering region increases, the scattering frequency is shifted due to the Doppler effect, and the portion of the scattered light falling beyond the filter cutoff increases, causing the intensity of the light transmitted through the filter increase. The intensity of the transmitted light is directly related to the shifted frequency, thereby providing a measurement of the velocity of the gas. The cell transmission can be quantified by comparing the intensity of the light transmitted through the cell with the intensity seen in the absence of the cell, thereby leading to a quantitative measure of the relative velocity between the light source and scattering volume.

53 Claims, 12 Drawing Sheets

ABSORPTION LINE FILTER WINDOW AND METHOD FOR VELOCITY MEASUREMENTS BY LIGHT SCATTERING

This application is a continuation-in-part of application Ser. No. 07/461,230, filed 01/05/90, now abandoned.

FIELD OF THE INVENTION

The field of the present invention is directed generally towards the measurement of velocity in association with the motion of air, and more particularly towards recording two-dimensional velocity field cross sections for applications in fluid mechanics, and single-point velocity measurements as part of an aircraft optical air data system to determine aircraft speed and/or wind shear.

BACKGROUND OF THE INVENTION

The use of light scattering from particles is well known and has led to such extensively used systems as the Laser Doppler Anemometer (LDA) as taught in Reynolds et al., U.S. Pat. No. 4,715,707 and, more recently, Particle Imaging Velocimetry (PIV) (see Adrian, R. J., "Int. J. of Heat and Fluid Flow", Vol. 7, page 127 (1986). In these cases, the motion of particles is tracked either using coherent processes or rapid sequential images. Resolving individual particles over a wide field of view requires exceedingly high resolution detection, so LDA and PIV are generally useful only where the field-of-view is limited and the particle seeding concentration is carefully controlled. In air, particle concentrations may vary over a wide region and, in particular, at high altitudes, particle concentrations may be very low and particle sizes so small that scattering from single particles becomes an unreliable method for measuring airspeed. Similarly, in high speed flow facilities, large particles may not track the flow, and velocities may need to be measured in an instantaneous fashion. In the latter case, randomly occurring particles may not be present at the proper location when the measurement is made.

While the present invention may be used in conjunction with single particles, its major strength is that velocities can be measured by observing scattering from multiple particles or direct scattering from air molecules. Molecular scattering, which is called Rayleigh scattering, has recently been shown to be a powerful new tool for optical flow field diagnostics [see B. Yip, D. Fourguette, and M. B. Long, Applied Optics, Vol. 25, page 3919 (1986)]. In particular, Rayleigh scattering using ultraviolet light [see M. Smith, A. Smits, and R. Miles, Opt. Lett., Vol. 14, page 916 (1989)]has produced two-dimensional cross-sectional images of high-speed flow fields. Similar images of scattering from very high densities of small particles have been used to observe cross sections of combusting gases and mixing phenomena. One of the embodiments of this invention is configured in a manner similar to Rayleigh scattering or many particle imaging systems, but with an absorption line filter window to allow the determination of the velocity component field. Alternate approaches to the measurement of velocity based on nonlinear optical phenomena such as stimulated Raman gain spectroscopy (see Exton, U.S. Pat. No. 4,624,561) integrate the velocity along a line and cannot be used for imaging. They are also double-ended, requiring a retroreflector or detector at the far end of the sample cell. This means they cannot be used for ranging and are of limited application in flow facilities.

Optical systems in aircraft which have been used to observe airspeed and to look ahead for wind shear rely on particle scattering. The normal particle scattering systems involve collecting the scattered light returned and performing optical heterodyne (see Breen, U.S. Pat. No. 4,822,164), interferometric (see German DT 2500376 and Domey et al, U.S. Pat. No. 4,334,779), or spectral analysis (see Woodfield, U.S. Pat. No. 4,585,341) of that scattered light as a method to compare it with the original laser beam that was sent. Spectral analysis, interferomic, and optical heterodyne techniques are subject to noise fluctuations due to the random phases of the scattered light. Such detection techniques are only accurate when the scattered light appears to be a point source, so that random phase interferences across the face of the optical detector or interferometer do not wash-out the signal. As a consequence, such detector schemes cannot be used to observe volume scattering phenomena or to image. At high altitudes, particle scattering is significantly reduced so these techniques become unreliable.

Another embodiment of the invention is a device to accurately measure frequency shifts associated with either volumetric multiparticle scattering or Rayleigh scattering so aircraft airspeed and wind shear can be detected. This device will operate even in the absence of particles and can be used in a LIDAR (Light Detection and Ranging) type configuration to give velocity as a function of distance from the aircraft with a single laser pulse. This makes the detection of velocity discontinuities such as those associated with clear turbulence more easily detectable.

The use of atomic resonant line filters to detect narrow linewidth sources has been described by Gelbwachs [see J. A. Gelbwachs, IEEE J. Quant. Electronics, Vol. 24, page 1268 (1988)]and others. In their devices, a narrow linewidth source overlaps specific atomic or molecular transitions, leading to fluorescence or photoionization. These atomic filters do not rely on the coherence of the light and, therefore, can be used to observe single frequency light coming from all angles. Generally, the efficiency of these fluorescence or ionization type filters is poor (approximately 2%), but their selectivity is very high since off-resonance light produces virtually zero background. They are intrinsically non-imaging since the original light is totally absorbed, but some configurations using very strong absorption and cellular design are able to give low resolution imaging capability [see E. Korevaar, M. Rivers, C. S. Liu, SPIE Vol. 1059, Space Sensinq Communications and Networking, p. 111 (1989)]. For the applications discussed here, it is important to have a filter with a high efficiency since light scattered by small particles and Rayleigh scattering are extremely weak. Atomic blocking filters have been proposed by She et al. for LIDAR applications [see H. Shimizu, S. A. Lee, C. Y. She, Appl. Opt., Vol. 22, p. 1373 (1983)]. In this case, the narrow absorption line is used to remove particle scattering so temperature and density measurements can be made with Rayleigh signals.

The use of atomic or molecular filters has been described by Komine (U.S. Pat No. 4,919,536) for the measurement of velocity fields by laser light scattering from particles. His approach requires that the flow be seeded with particles, and that the filter cutoff be a linear function of frequency.

SUMMARY OF THE INVENTION

An object of the invention is to provide an improved method and apparatus for measuring the velocity of aircraft and/or detecting wind shear.

Another object of the invention is to provide an improved method and apparatus for recording two-dimensional velocity field cross sections using the scattering of light from particles or molecules in air.

Yet another object of the invention is to provide a method and apparatus for using the scattering of light from multiple particles or direct scattering from air molecules to measure the relative velocity between objects, such as an aircraft, and air.

With the problems of the prior art in mind, in one embodiment of the invention, a laser beam is directed into a scattering region in air, for scattering light from particles in the region, and passing the scattered light through filter and detection means, for measuring the Doppler shift between the laser beam source and scattered light as change in intensity corresponding to the relative velocity between the laser source and scattering region.

Other embodiments of the invention permit the measurement of velocity as well as temperature by scattering from gas molecules, and the measurement of velocity by scattering from particles. Further, either lasers or incoherent light sources may be utilized for velocity measurements. These embodiments of the invention also teach that by tuning the laser frequency in relation to the sharp cutoff frequency of the filter, the apparatus can be optimized for a particular velocity region while still blocking strong scattering from windows, walls, and other objects which normally obscure or contaminate the Rayleigh scattered signal. The filter is typically a sharp cutoff notch type filter.

BRIEF DESCRIPTION OF THE DRAWINGS

Various embodiments of the invention will be described below with reference to the accompanying drawings, in which like items are identified by the same reference designation, wherein.

DETAILED DESCRIPTION OF PREFERRED EMBODIMENTS OF THE INVENTION

Figure 1:
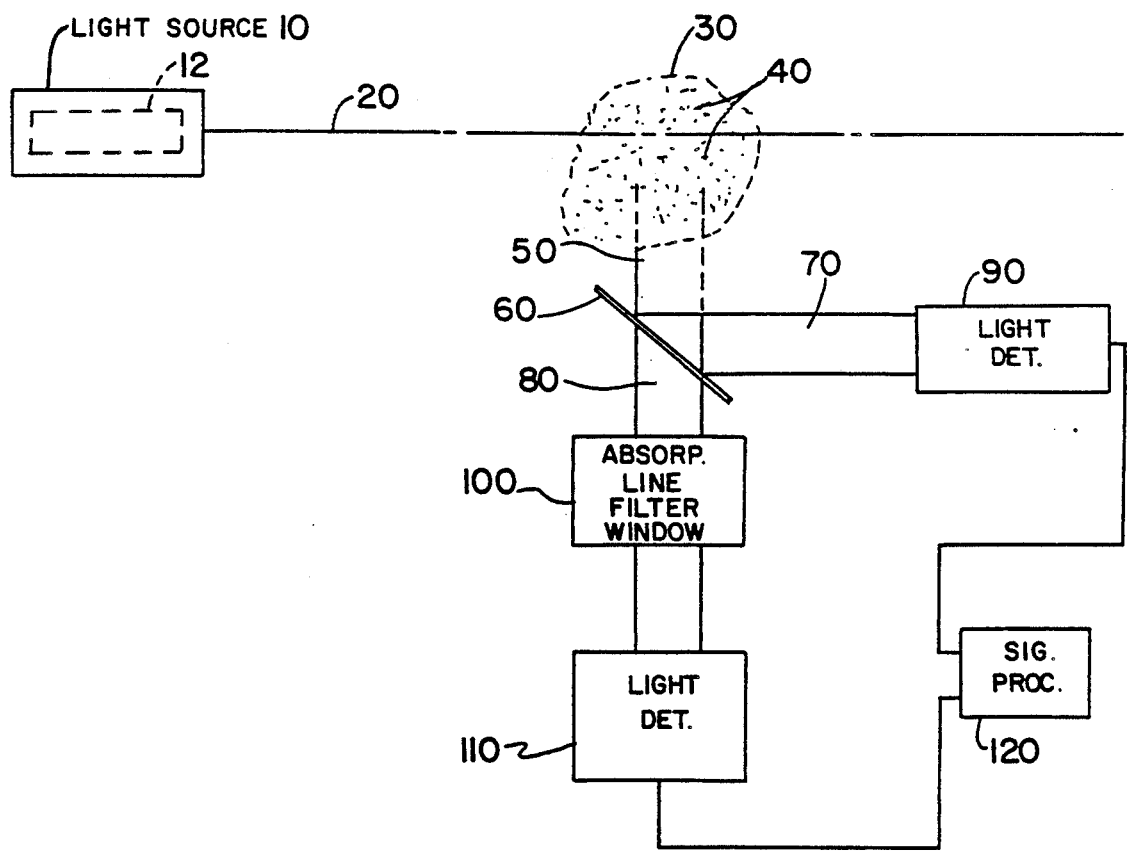
FIG. 1 is a block drawing of a velocity measuring system of one embodiment of the invention.

The present invention will first be described in general terms, followed by greater detail below. The various embodiments of the invention rely on the fact that the light scattering from moving particles and moving air molecules is frequency shifted by the Doppler effect. Also relied upon is the fact that the absorption of light passing through a cell can be accurately measured while still maintaining good throughput efficiency. In a basic embodiment of the invention, a narrow linewidth source, such as a pulsed or continuous wave laser, is tuned onto resonance with the gaseous vapor in a cell. For example, an injection-locked and frequency-doubled Nd:YAG laser can be tuned onto resonance with an absorption line in iodine molecular vapor in the vicinity of 532.0 nm. Alternatively, an injection-locked frequency-tripled Alexandrite or frequency tripled titanium sapphire laser can be tuned onto a mercury vapor absorption at 253.7 nm. If a cell filled with the appropriate vapor, in the latter two examples either iodine or mercury, respectively, is placed in front of the detector, then light directly scattered from these respective sources is significantly attenuated. The amount of attenuation can be controlled by the vapor pressure, the cell length, the presence of other foreign gas species which control the linewidth, and the frequency of the laser.

Strong attenuation provides a black background which eliminates not only scattering from non-moving gas, but also scattering from various optical elements which would otherwise introduce background noise into the detector system. As the gas in the scattering volume begins to move, the light scattered is Doppler-shifted in frequency, whereby it no longer falls at the center of the absorption line of the atomic or molecular gas. The transmission as a function of gas velocity depends on the geometry of the experiment as well as on the length of the cell, the linewidth of the laser, the linewidth of the atomic or molecular line, and the exact frequency of the laser. Generally, the laser is selected to be single axial mode so its frequency is much narrower than the linewidth of the atomic or molecular gas. With injection-locked, high-power pulsed lasers, this may correspond to linewidths on the order of tens of megahertz. For continuous wave lasers, linewidths on the order of a megahertz or less are easily attainable.

For some applications, the laser may be tuned slightly away from resonance to allow the zero velocity component to be observed. For example, if both positive and negative velocities are expected in the sample region, offsetting the center frequency of the laser will allow motion in both directions to be distinguished and quantitatively evaluated. The minimum linewidth of the gas vapor in the cell will be determined by Doppler broadening and, in the case of iodine, hyperfine splitting. By tuning the laser frequency, maximum sensitivity can be obtained. By broadening the line with a foreign gas, the range of velocities over which the cell can be operated may be selected. The velocity sensitivity is related to the number of photons per pixel recorded, and the absolute calibration is found by ratioing the intensity seen through the gas cell with that seen in the absence of the gas cell. For single pulse applications, this may be done instantaneously by splitting the image and recording it either with two separate cameras, one looking through the cell and one not, or by forming a double image on a single camera. For most accurate velocity measurements, scattering from the entire scattering volume may be collected with a single detector to minimize shot noise.

The absorption line filter window operates somewhat differently depending on whether the scattering is predominantly from particles or from air molecules. In the case of small particles, the frequency shift associated with the velocity is slightly affected by a component associated with the Brownian motion of the particles. As the particles become smaller, this Brownian component increases, but, unless the flow is very slow, it may be neglected. In the normal embodiments of this invention, each resolvable volume element will contain many particles, so the Brownian component will be averaged and will cause the shifted line to have a width greater than that of the original illumination source.

Scattering from the air molecules is more complicated due to both thermal and acoustic effects. Thermal broadening will occur due to the random molecular motion. This will cause the scattering to be significantly broadened: air illuminated by a single frequency source will have a scattering linewidth of several GHz if the backscattering is observed. If the density is high, Brillouin scattering becomes a factor and strong peaks develop on the scattered line profile at a velocity associated with the speed of sound. This effect can be minimized by using a higher frequency (i.e., ultraviolet) source and by confining measurements to air densities of one atmosphere or below. The thermal broadening will contribute to some uncertainty of the measurements, particularly if the temperature of the air varies over a wide range.

As is known in the art, the Doppler shift has contributions from the velocity component in the direction of the source as well as from the velocity component in the direction of the detector. For the embodiment of this invention designed to measure air speed and wind shear, the scattering will be collected at 180°, in other words, direct backscattering. In this case, the illumination and detection velocity components are opposite to one another, so the Doppler shift is uniquely representative of one velocity component and no ambiguity results. In applications where the illumination is 90° to the detector, such as often is the case in two-dimensional imaging, a velocity ambiguity results. This may be eliminated by recording scattering in three separate (preferably orthogonal) directions, or by observing the scattering cross section simultaneously from the other side. In the latter case, the velocity component in the direction of the detector contributes positively to one image and negatively to the other, so it can be unambiguously determined. The velocity component in the illumination direction can then be found.

A major advantage of the various embodiments of the invention is that none are dependent on the coherence of light. Each is detecting the color or frequency of scattered light reflected to a detector. This means that volumetric images can be observed, that is, the light reflected from many particles can be detected, providing more robust or higher level light signals for detection relative to a coherent system. Coherent light dependent systems cannot easily be used for imaging.

The simplest embodiment of this invention is a device and method to measure velocity by scattering of a narrow linewidth laser from small particles suspended in the air or fluid to be measured. As shown in FIG. 1, a narrow linewidth laser source 10 emits a beam 20 which passes through the scattering region of interest 30, a given distance from laser source 10. This region contains one or more small particles 40 which are illuminated by the beam and scatter light 50 into the detection apparatus. This light first encounters a beam splitter 60, and is separated into two beams 70 and 80. The first beam 70 passes directly into a first light detector 90 which measure the scattering intensity. The second beam 80 passes through the absorption line filter window 100 into a second light detector 110, which measures the light passing through the absorption line filter window 100. Signals from the first detector 90 and the second detector 110 are brought to a signal processing unit 120, which takes the ratio of the two signals so that the transmission through the absorption line filter window can be determined.

Figure 2A:
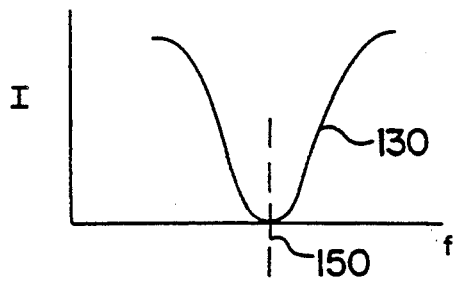
FIGS. 2A through 2C show a filter response curve, laser output signal curve, and detector response curve, respectively, for one embodiment of the invention.
Figure 2B:
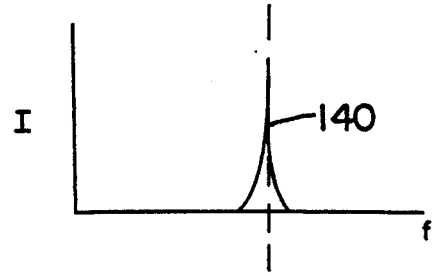
Figure 2C:
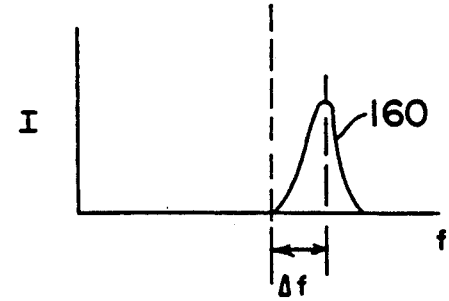
Figure 3:
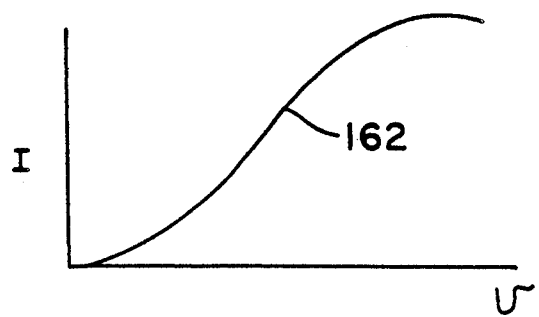
FIG. 3 shows a filter window transmission curve as a function of velocity, for one embodiment of the invention.

The absorption line filter window 100 is a gas cell containing atomic or molecular vapor with at least one absorption line in the vicinity of the scattered light frequency. FIG. 2A shows a diagram of the absorption curve 130 as a function of frequency for such an atomic or molecular absorption cell 100. The laser source 10 light output curve 140 (see FIG. 2B) is narrow in linewidth and, for this embodiment, is chosen with a frequency corresponding to the frequency of maximum absorption frequency 150 of the absorption line filter window 100. If the laser source 10 and particles 40 in the sample volume 30 are not moving, then the scattered light 80 will be at the same frequency as the laser illumination, and will be attenuated by the absorption line filter window 100. If, on the other hand, the particles 40 and/or laser source 10 are moving relative to one another in a positive or negative manner, as shown in FIG. 2C, the scattered light intensity curve 160 will be frequency shifted so that it no longer falls at the center of the atomic window absorption line. This occurs because the incident light is shifted in frequency by the Doppler effect, due to the relative motion between the scattering particle and the light source or laser 10. This frequency shift can be expressed as $\Delta f = f\, v/c$, where f is the frequency of the illumination source, v is the velocity of the particles, c is the speed-of-light, and $\Delta f$ is the frequency shift. FIG. 3 is a sketch of the transmission T of the line filter window 100 as a function of particle velocity V. Since the ratio of the light collected by detector 110 divided by the light collected by detector 90 equals this transmission, the value of the velocity can be unambiguously determined from the collected signal levels. Light scattered from non-moving surfaces including the walls surrounding the flow facility, optical elements, etc. is absorbed by the filter 100, significantly reducing background noise.

Figure 4:
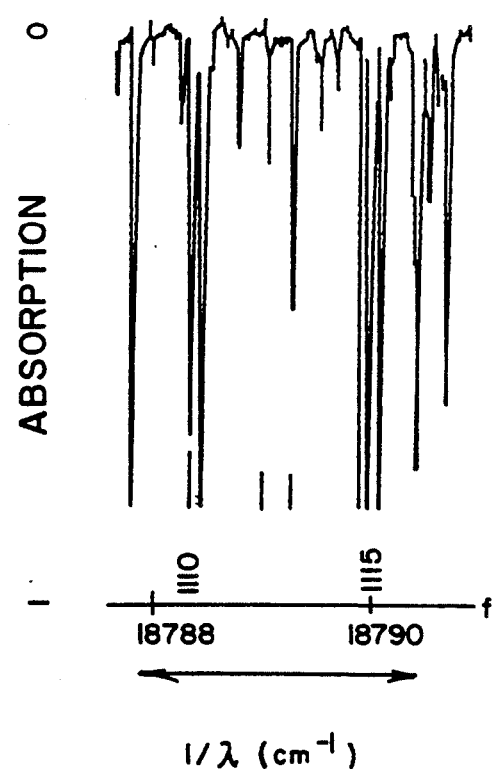
FIG. 4 shows the absorption spectrum of iodine vapor in the vicinity of a frequency doubled Nd:YAG laser.

An example of such a device includes an injection-locked and frequency-doubled Nd:YAG laser 10 to provide a narrow linewidth source beam at 532.0 nm (nanometers). This light is scattered by small particles, split by a beam splitter 60, and then passed through an atomic absorption line filter window 100 containing iodine vapor. FIG. 4 shows the absorption spectrum of iodine vapor in the vicinity of the limited tuning range of the laser source. The injection locked Nd:YAG laser 10 may be tuned by changing the temperature of the injecting laser 11 (via a temperature chamber 12, shown in phantom) so that the frequency of the laser source 10 overlaps one of the strong absorption lines in the iodine vapor. By using an absorption line filter window 100 of approximately 20.0 cm long, together with iodine with a vapor pressure corresponding to room temperature, scattering at the laser frequency is strongly attenuated. Scattering from moving particles, however, shifts the frequency, and the increased transmission is detected through the iodine cell 100. The velocity of the particles can then be determined from the transmission coefficient T (see curve 162 of FIG. 3).

Figure 5A:
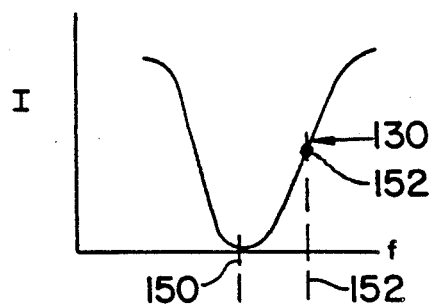
FIGS. 5A and 5B show an absorption window spectral profile for a filter, and a laser light output signal having a frequency at the half-power transmission point of the filter, respectively, for one embodiment of the invention.
Figure 5B:
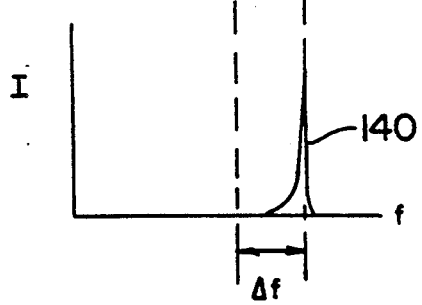
Figure 6:
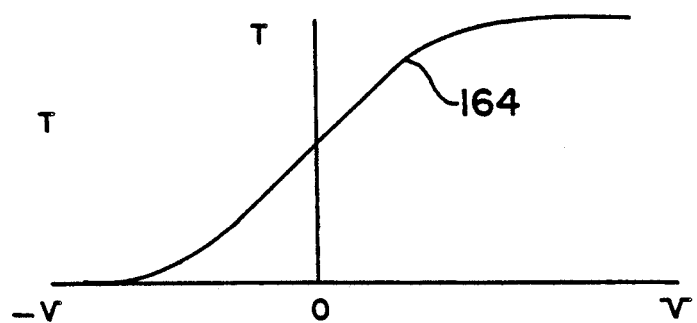
FIG. 6 shows a curve for a window filter transmission versus velocity for an embodiment of the invention.

This embodiment of the invention may be significantly enhanced in its capability by replacing detectors 90 and 110 with imaging detectors such as film, charge-coupled devices, or video cameras. Since the transmission of the light through the cell is independent of the specific path taken, image quality is preserved and this particular scattering configuration may be used to generate images of velocity fields. This embodiment may be further enhanced by changing the frequency of the laser source 10 so the transmission curve can be placed with optimal response in the vicinity of the expected measured velocities. For example, if negative velocities are expected, the laser source can be tuned off of the atomic or molecular vapor absorption line peak 150 (see FIG. 2A) so that even zero velocity particles have some transmission. An example of that case is shown in FIGS. 5A and 5B, where the laser frequency 140 is chosen to be at the half-power transmission point 152 of the absorption line filter window 100. In this case, positive velocities would correspond to higher transmission and negative velocities would correspond to lower transmission, or vice-versa depending upon the geometry of the apparatus, as shown by curve 164 in FIG. 6.

Figure 7:
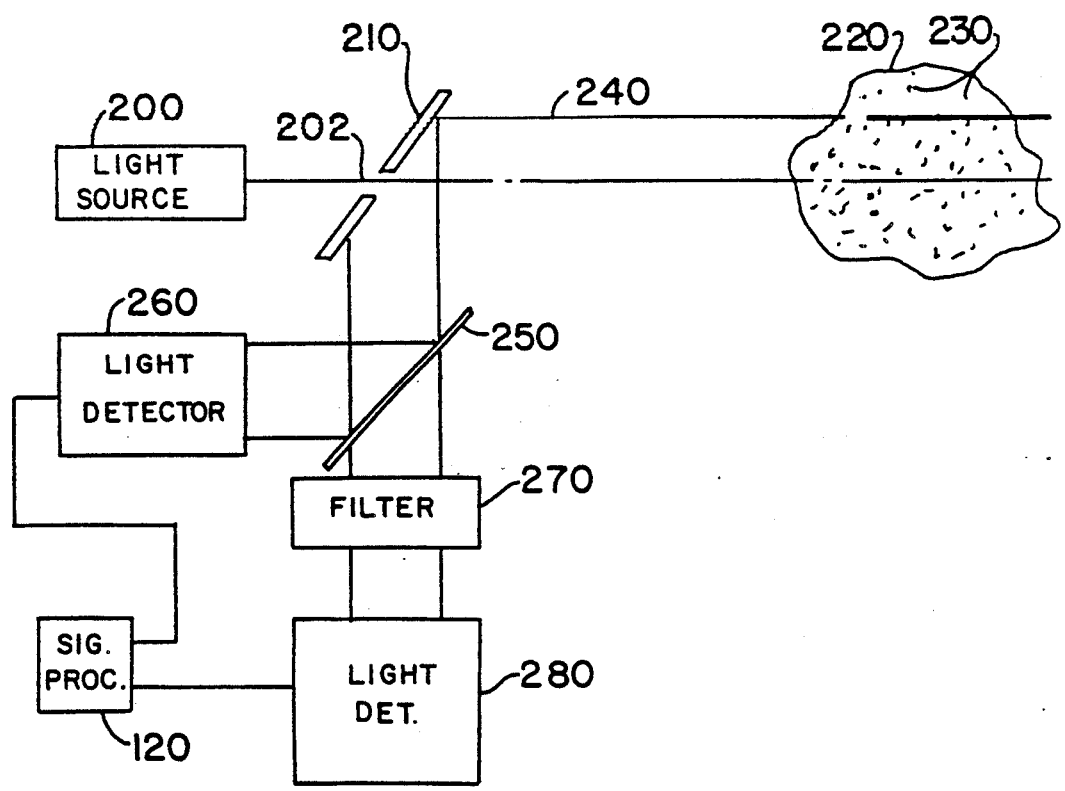
FIG. 7 is a block diagram showing another embodiment of the invention.

A second embodiment of the invention is similar to the first except that light scattered in the backward direction is collected. This embodiment is shown in FIG. 7, where light from a narrow linewidth laser source 200 passes through a small hole 202 in a collection mirror 210 and illuminates a scattering volume 220 containing one or more small particles 230. Light backscattered from those particles 240 is reflected off of the collection mirror 210 onto a beam splitter 250. Part of the beam is reflected into a first detector 260, and the remainder of the beam passes through the beam splitter and through an absorption line filter window 270 into a second detector 280. As with the first embodiment, if the narrow linewidth laser 200 is tuned onto the absorption resonance of an atomic or molecular gas which is placed inside the absorption filter window 270, then the transmission is directly proportional to the velocity of the particles 230. In this case, however, since direct backscatter is collected, only one velocity component contributes to the Doppler shift as opposed to contributions from the velocity component in the source direction, and the velocity component in the detector direction in the first embodiment. The rejection of direct scattering off optical components and other components is particularly important in this embodiment, since the laser 200 passes out the same window and through the same optical elements as does the returned scattered light.

Figure 8:
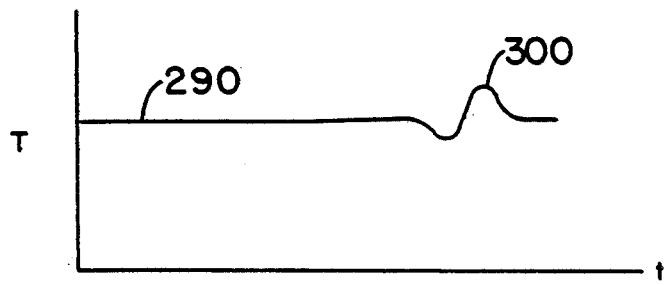
FIG. 8 is curve of transmission versus time for a short pulsed laser based embodiment of the invention associated with FIG. 7.

If the narrow linewidth laser 200 is pulsed, then the backscatter may be observed as a function of time as shown in FIG. 8. In this case the transmission as a function of time curve 290 will be constant if the apparent motion of the gas is constant. This would be the case, for example, if such a device were located on the nose of an aircraft and observed the air in front of the aircraft in order to determine airspeed. If there were, however, a change in the motion of the air, potentially associated with clear air turbulence, then there would be a variation in the transmission at a time representative of the round-trip light propagation time to the location of that disturbance. In FIG. 8 this is shown as a variation 300 of the signal curve 290, which would indicate the magnitude and distance of the velocity component of clear air turbulence in the direction of the laser illumination.

Figure 9:
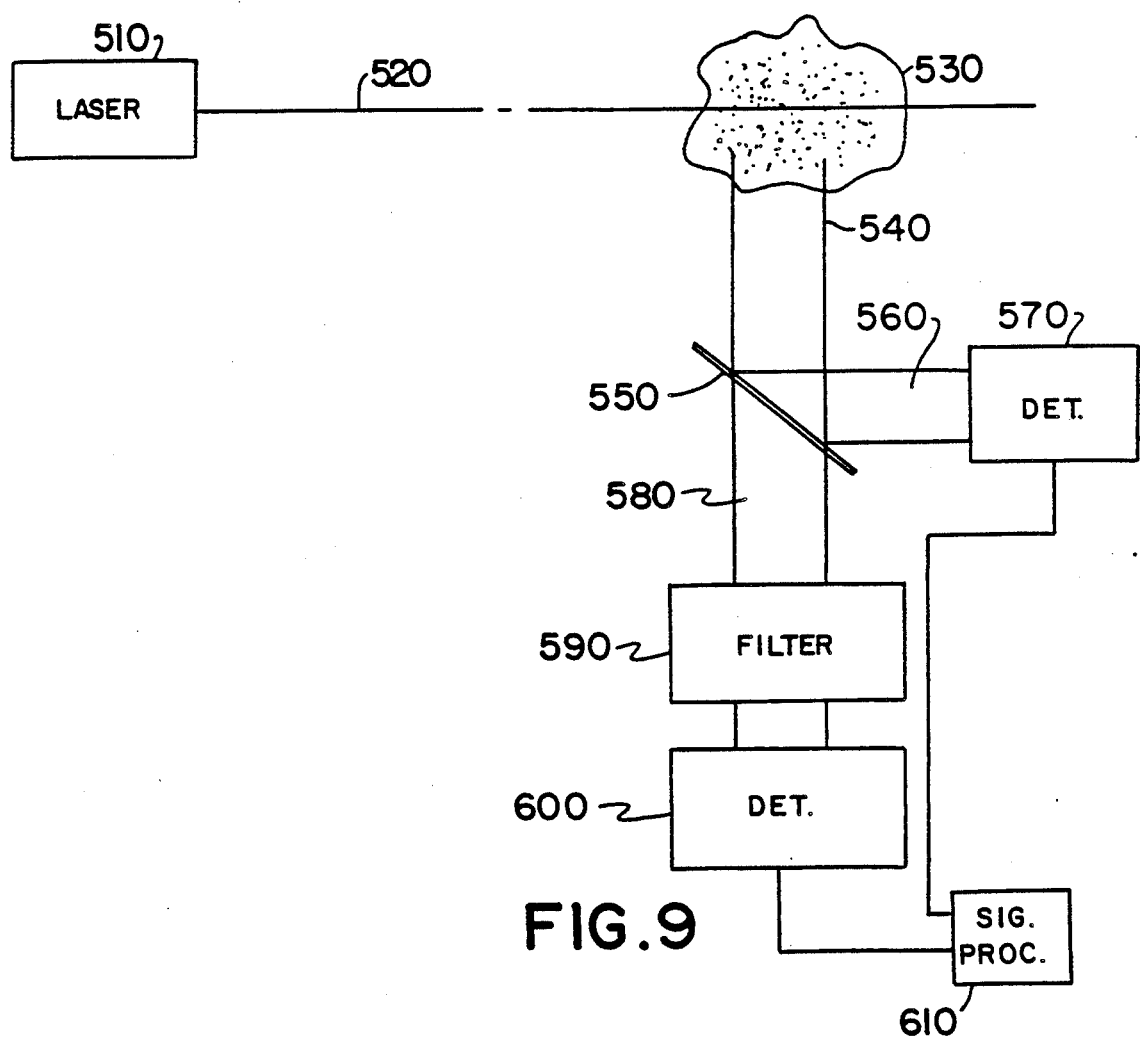
FIG. 9 is a block diagram showing yet another embodiment of the invention.

A third embodiment of the invention is configured in a manner similar to the first, but involves scattering from air molecules rather than suspended particles. This is called Rayleigh scattering, and the intensity of the scattering is a strongly increasing function of the illumination frequency. As a consequence, a Rayleigh scattering system might be optimally operated using a narrow linewidth ultraviolet laser source in conjunction with an ultraviolet absorbing atomic or molecular gas. A diagram for such a system is shown in FIG. 9 where the laser source 510 would potentially be a narrow linewidth ultraviolet source, possibly a frequency tripled Alexandrite or frequency tripled titanium sapphire laser operating at 253.7 nm, near the absorption line of mercury vapor. The output of this laser 520 passes directly into a scattering volume 530, and is scattered off of air molecules into a scattered light path 540 to a detector system 542. The latter includes a beam splitter 550 for separating the scattered light 540 into two parts. The first part 560 passes directly into a first detector, detector array, or camera 570. The remainder of the beam passes through the beam splitter 580, and through the absorption line filter window 590 into a second detector array or camera 600. The outputs from the first detector 570 and the second detector 590 are passed into a signal processor 610, and ratioed to generate an output representative of the transmission of the atomic or molecular line filter window. Direct scattering from optical elements, cell walls, etc., is again suppressed by the filter window, a very important feature since Rayleigh scattering is so weak. In the particular case of the laser source operating at 253.7 nm, the line filter window 590 would contain mercury vapor which has an absorption peak at that wavelength.

Figure 10A:
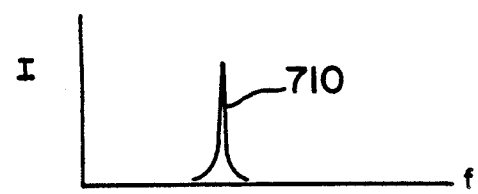
FIGS. 10A, 10B, and 10C show curves of light intensity versus frequency for a laser source, scattered light at two different temperatures, and a window absorption filter, respectively, for the embodiment of the invention of FIG. 9.
Figure 10B:
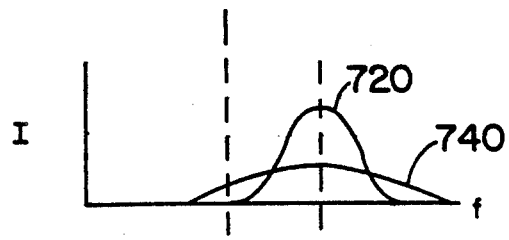
Figure 10C:
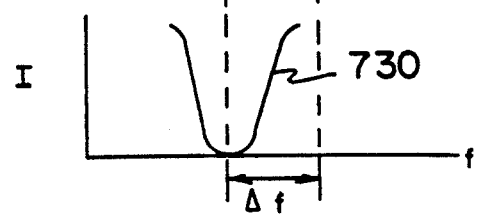
Figure 11:
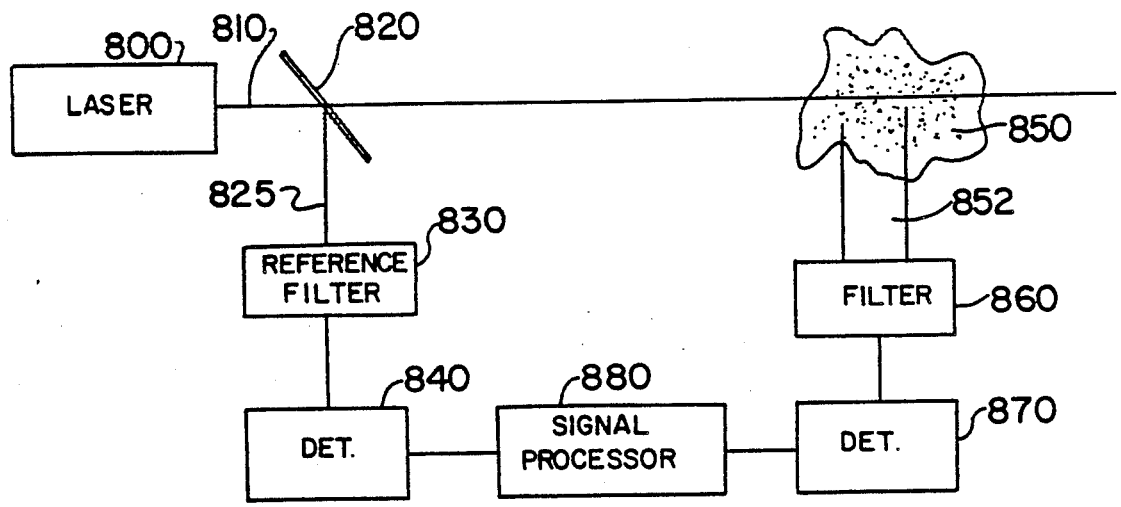
FIG. 11 is a block diagram showing yet another embodiment of the invention.

The atoms or molecules in the sampled volume 530 have a velocity which is a combination of the thermal motion plus the average motion of the flow field. The thermal motion causes the scattered laser light to be symmetrically broadened in frequency due to the random nature of the Doppler shifts. Directed motion causes an overall shift in frequency of the scattering peak. These effects are shown in FIG. 10. The original laser light beam 520 has narrow linewidth and a well defined frequency as shown by curve 710. The light scattered from the molecules is shifted in frequency by the average motion and broadened by the thermal motion, as shown by curve 720. When this light is compared with the absorption profile 730 of the absorption line filter window 590, it is clear that the transmission intensity I is related not only to the velocity shift, but to the temperature of the gas. For example, a higher temperature gas will have a broader spectrum, but the same overall shift, as shown by curve 740. This will change the transmission characteristics of the absorption line filter window 590. If the temperature is known, this effect does not create an ambiguity. If the temperature is unknown, there is some ambiguity in the measurement of the velocity. This can be removed in several ways. For example, as shown in FIG. 11, a tunable narrow linewidth laser 800 can be used in conjunction with a reference cell 830. Here, the tunable laser beam 810 first passes through a beam splitter 820, which removes a small portion of the light 825 and passes it through a reference cell 830 which is identical to the absorption filter window cell 860. After passing through cell 830, the light 835 is then collected in a reference detector 840. Light 852 from the scattering volume 850 also passes through an absorption cell 860 and into a detector or detector array 870.

Figure 12A:
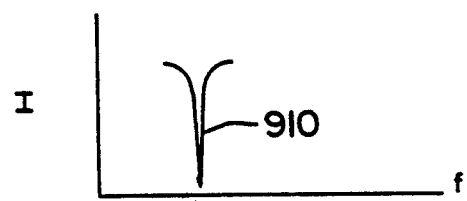
FIGS. 12A and 12B show intensity versus frequency curves, respectively, for two light detectors of the embodiment of the invention of FIG. 11.
Figure 12B:
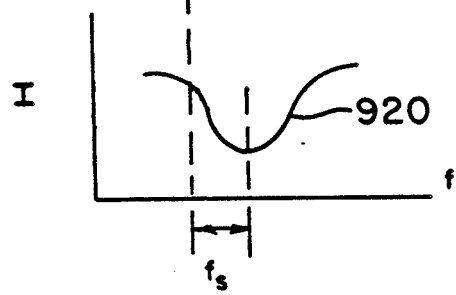

FIGS. 12A and 12B show the outputs 910, 920 of the two detectors 840, 870, respectively, as a function of laser frequency. The reference detector 840 shows a narrow linewidth curve 910 characteristic of the absorption line filter window 830 or 860. Light scattered from the moving atoms and molecules is shifted in frequency and broadened by the thermal motion. This shifted and broadened lineshape light passes through the atomic filter window 860, and is detected via detector 870 as curve 920, in this example. When the curves or signal 920 is compared with the reference detector output 910, the frequency shift $f_s$ and linewidth can be determined via signal processor 880, leading to a measurement of the velocity and temperature.

Figure 13:
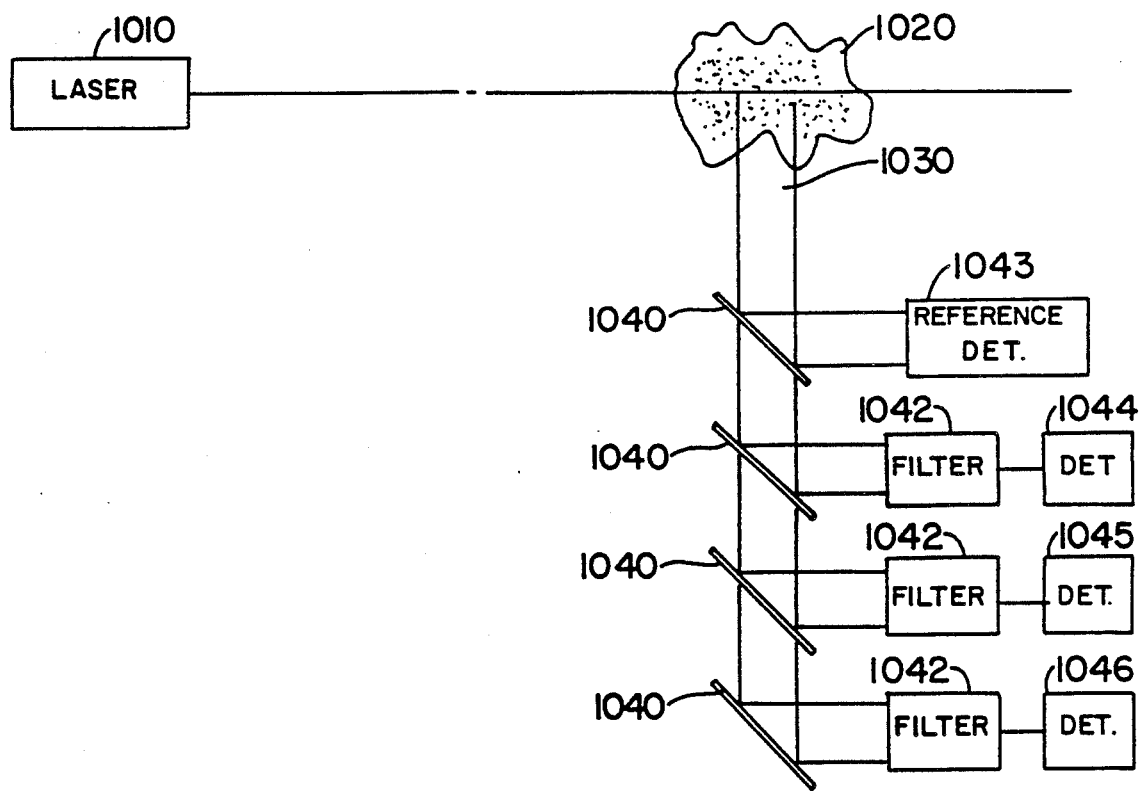
FIG. 13 is a block diagram showing still another embodiment of the invention.
Figure 14A:
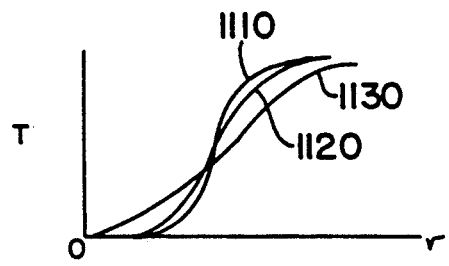
FIGS. 14A, 14B, and 14C show curves of transmission versus velocity at different temperatures for two light detectors, respectively, of the embodiment of the invention of FIG. 13.
Figure 14B:
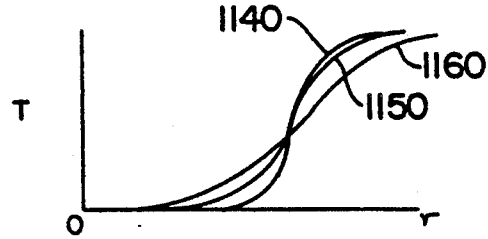
Figure 14C:
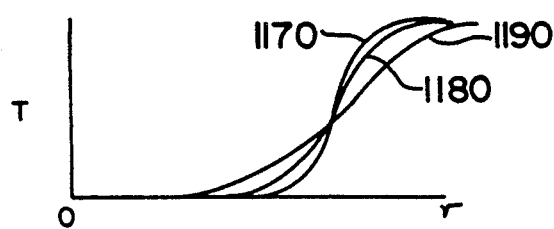

An alternative approach is to pass the scattered light 1030 from the sample volume 1020 through two or more absorption line filters 1042 with differing absorption linewidths, as shown in FIG. 13. A narrow linewidth laser 1010 illuminates the scattering volume 1020, as shown. The scattered light 1030 is split by several beam splitters 1040, through filters 1042, into separate detectors, or detector arrays 1044, 1045, 1046, respectively. One detector 1043 observes the light 1030 directly with no filter. The others have filters 1042 in front of them with either different linewidths or different absorption line centers, respectively. For example, mercury vapor has several different isotopic species whose absorption frequencies differ by approximately 5.0 GHz. Each filter 1042 could contain a different isotopic species and, therefore, each would produce a slightly shifted transmission spectrum as a function of velocity. Alternatively, the length, optical depth, or foreign gas pressure broadening of each of these filters could be different, leading to different cut-off frequencies. An example is shown in FIG. 13, assuming four detectors. The one detector 1043 with no filter or cell is used for reference. The transmission seen by the other three detectors 1044, 1045, and 1046, respectively, is shown as three groupings of curves as a function of velocity. Each filter transmission is a function of the velocity and temperature as is shown by transmission curves 1110 (for a temperature $T_1$), 1120 (for a temperature $T_2$), and 1130 (for a temperature $T_3$), respectively (see FIG. 14A), as seen by the first detector 1044; curves 1140 (for a temperature $T_1$), 1150 (for a temperature $T_2$), and 1160 (for a temperature $T_3$), respectively (see FIG. 14B), as seen by the second detector 1045; and curves 1170 (for a temperature $T_1$), 1180 (for a temperature $T_2$), and 1190 (for temperature $T_3$) as seen by the third detector 1046 (see FIG. 14C). In each figure, the three individual curves are indicative of three different possible temperatures, $T_1$, $T_2$, and $T_3$ in the sample region 1020. Since all detectors 1044–1046 are observing the same scattering region 1020, a transmission measurement by at least two detector-filter combinations will determine both the velocity and the temperature of the molecules. A similar configuration could be constructed in a backscatter geometry similar to that shown in FIG. 7, in order to generate velocity and temperature profiles as a function of distance.

Figure 15:
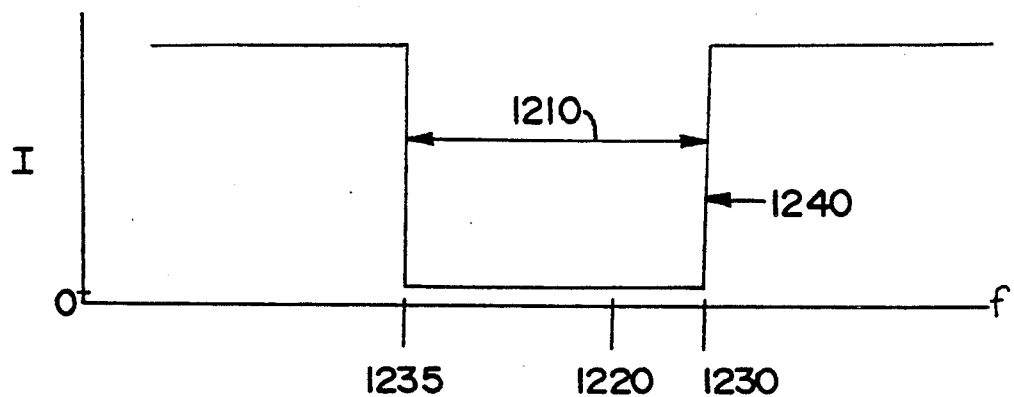
FIG. 15 shows a curve representing an idealized filter profile, having cutoff frequencies at 1230 and 1235, and a laser frequency at 1220.

The transmission characteristics of the atomic or molecular filters illustrated in the various embodiments of the invention herein, have a strong impact on the accuracy of the measurements. For Rayleigh scattering from gases, the light returned from the sample volume is broadened by both thermal and acoustic effects as well as frequency shifted by the overall motion. Since the bandwidth of the scattered light is high (on the order of GHz for air), the optimum filter has a wide absorption bandwidth and sharp cutoffs as indicated in FIG. 15. The filter width 1210 is ideally of the same order or wider than the bandwidth of the scattered light. The laser frequency 1220 lies within the absorption band of the filter near the upper 1230 or the lower 1235 sharp cutoff frequency depending upon the direction of the flow. The separation between the laser frequency and the cutoff frequency may be varied depending upon the velocity range of interest. The slope of the filter cutoff itself 1240 is as steep as possible to give good filter performance. Both iodine and mercury are good candidates for such filters due to their atomic weights. The iodine molecular weight is 254 and the mercury atomic weight is around 200. This causes the filter cutoff to be intrinsically sharp because thermal broadening is small. The filter cutoff may be made even sharper by using optically thick cells, in which the absorption constant at the center of the filter is many times greater than the inverse of the cell length. The width of the iodine filter is determined by hyperfine structure, whereby in the optically thick regime it closely resembles the ideal shown in FIG. 15. Mercury is broadened by the various isotopic lines and a mercury filter can be tailored by selecting specific isotopes. The width of both mercury and iodine can be further increased by adding a foreign gas or by heating the associated cell.

Figure 16:
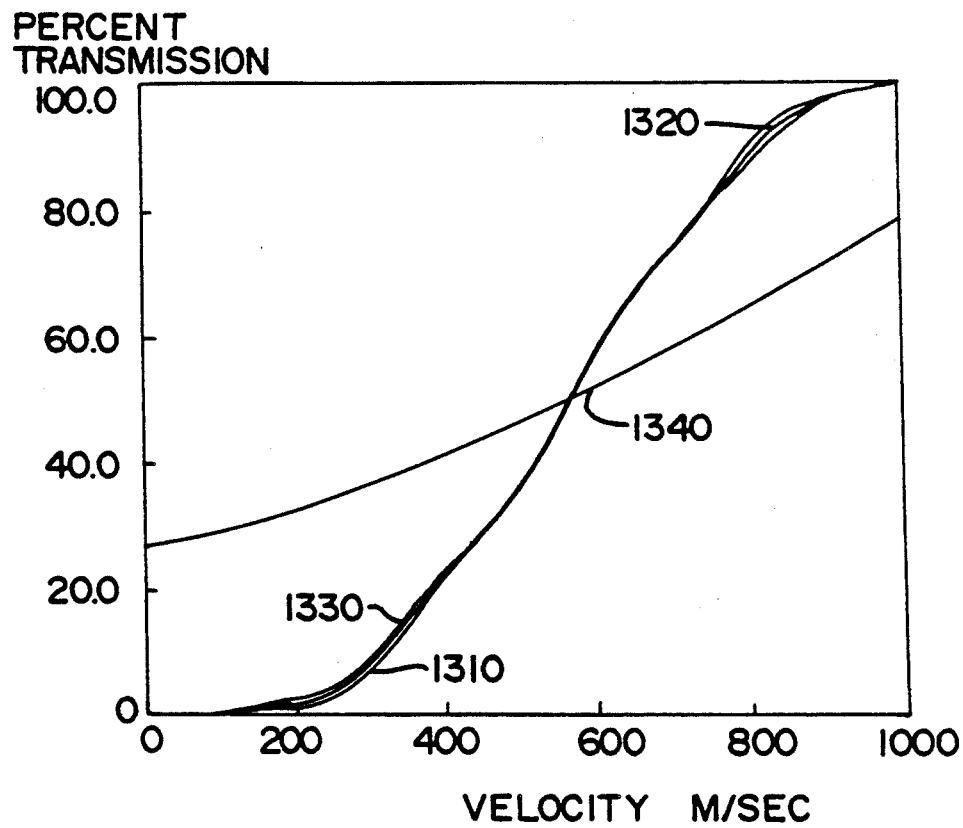
FIG. 16 is an example of the transmission of a sharp cutoff filter as a function of the flow velocity. This particular example has been calculated for an air flow with a velocity of 560 m/sec and temperatures of 115 K, 125 K and 135 K (relative to 1310, 1320 and 1330, respectively).

An example of the transmission of a sharp cutoff filter as a function of the flow velocity is shown in FIG. 16. This particular example has been calculated for an air flow with a velocity of 560 m/sec and a temperature of 125 K. With further reference also to FIG. 15, the laser frequency 1220 is chosen 1.5 GHz below the cutoff frequency 1230 such that the filter transmission is 50% for that velocity. The geometry is with the associated detector observing at 90° to the source (so imaging can be done), and the flow at 45° to both the direction from the scattering volume to the source and the direction from the scattering volume to the detector along the bisector of the angle. The curves in FIG. 16 show the ideal filter transmission as a function of velocity for three temperatures. Curve 1310 is for 115 K, curve 1320 is for 125 K, and curve 1330 is for 135 K. These are quantitative examples of the curves shown in FIG. 14.

As the cutoff edge of the filter becomes less sharp, the curves in FIG. 16 become flatter, so that the velocity and temperature become more difficult to determine. As the filter width becomes narrower, the filter transmission at low velocity begins to curve up due to scattering at frequencies below the lower cutoff of the filter. This leads to an ambiguity in the measurement of the flow velocity. The sharp cutoff and relatively broad blocking bandwidth of the filter allows the laser to be tuned over a wide range of frequencies while direct scattering from windows, walls, and other non-moving elements is still blocked by the filter. This means that the device can be optimized for velocity ranges from stationary flows up to hypersonic speeds.

Figure 17:
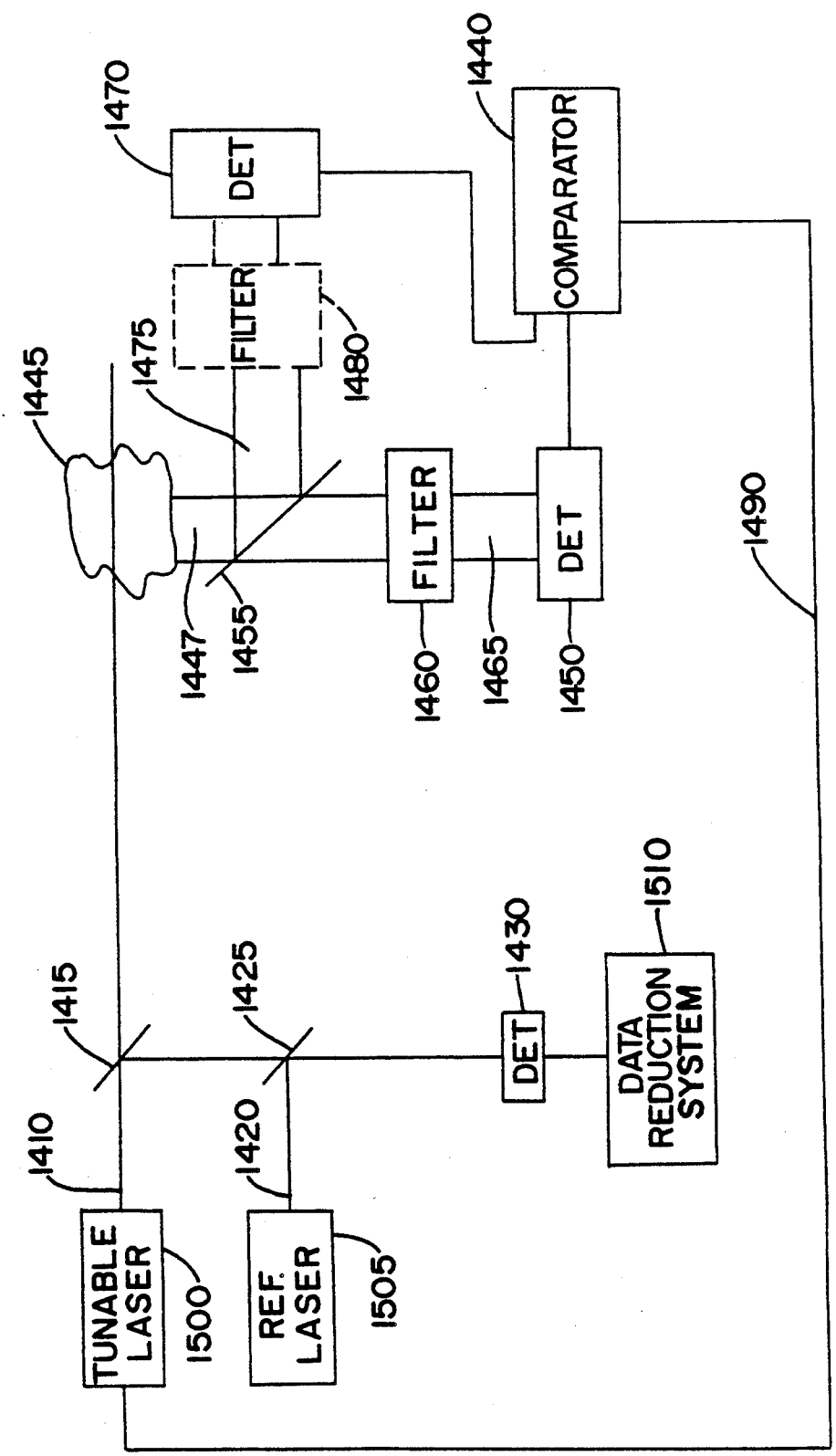
FIG. 17 is a block diagram of a velocity measuring system of one embodiment of the invention, wherein a laser light source is operated with a feedback loop which continually corrects the frequency of the laser so the filter always transmits at 50% (or some other specified value).

The associated laser can also be operated with a feedback loop, i.e. in a closed loop configuration, which continually corrects the frequency of the laser so that the filter always transmits 50% (or some other specified value). Then, by measuring the frequency of the laser compared to a reference, the velocity of the flow is known. An example of such a configuration is shown in FIG. 17. Part of the laser light 1410 (from turnable laser 1500) is compared with a reference laser beam 1420 (from reference laser 1505), and the heterodyne beat frequency is recorded with a detector 1430. Note that a beam splitter 1415 directs part of beam 1410 downward to beam splitter 1425, and another portion of beam 1410 into a scattering region 1445. Beam splitter 1425 also directs reference beam 1420 and the associated part of beam 1410 downward to detector 1430.

A comparator 1440 is set to determine the transmission of the filter 1460 from a pair of detectors 1450 and 1470. A beam splitter 1455 directs a portion of the Rayleigh or molecular scattered light 1447 toward detector 1470, and passes the remaining portion of light beam 1447 to filter or cell 1460. Detector 1450 monitors the light 1465 which has passed through the cell 1460, and the other detector 1470 monitors the light 1475 which has not passed through the cell or filter 1460. Alternatively, the second detector 1470 may monitor the scattered light 1475 through a second cell 1480, shown in phantom, whose bandwidth is different from the first detector 1450. A feedback loop 1490 controls the frequency of the turnable laser 1500 so that the transmission remains at 50% or some other selected value. The heterodyne beat frequency is then recorded and converted to velocity with a simple look-up table in the data reduction system 1510.

A narrow linewidth incoherent light source, such as a high intensity lamp, may also be used in conjunction with the atomic or molecular filter to measure gas velocity. The light source cannot be made as narrow as the laser line, and, as a consequence, light scattered from gas molecules is further broadened by the source width. This leads to curves similar to those shown in FIG. 16, but less steep. An example is shown as line 1340. In general, the light source is not frequency tunable, but has the advantage that the frequency is well known and non-varying. An example of such a light source is a mercury vapor lamp operating on the 253.7 nm line. This very bright transition also corresponds to an absorption line in cold mercury vapor. Therefore, by combining a mercury vapor lamp together with a mercury gas atomic filter, velocity measurements can be made. Care must be taken to minimize broadening effects in the mercury lamp in order to maintain as narrow a linewidth as possible. For example, passing the output of the mercury lamp through an atomic filter containing all but one isotope of mercury, gives a very narrow line which can be used as the scattering source. If the lamp operates with only the missing isotope, then the brightness is further improved.

Figure 18:
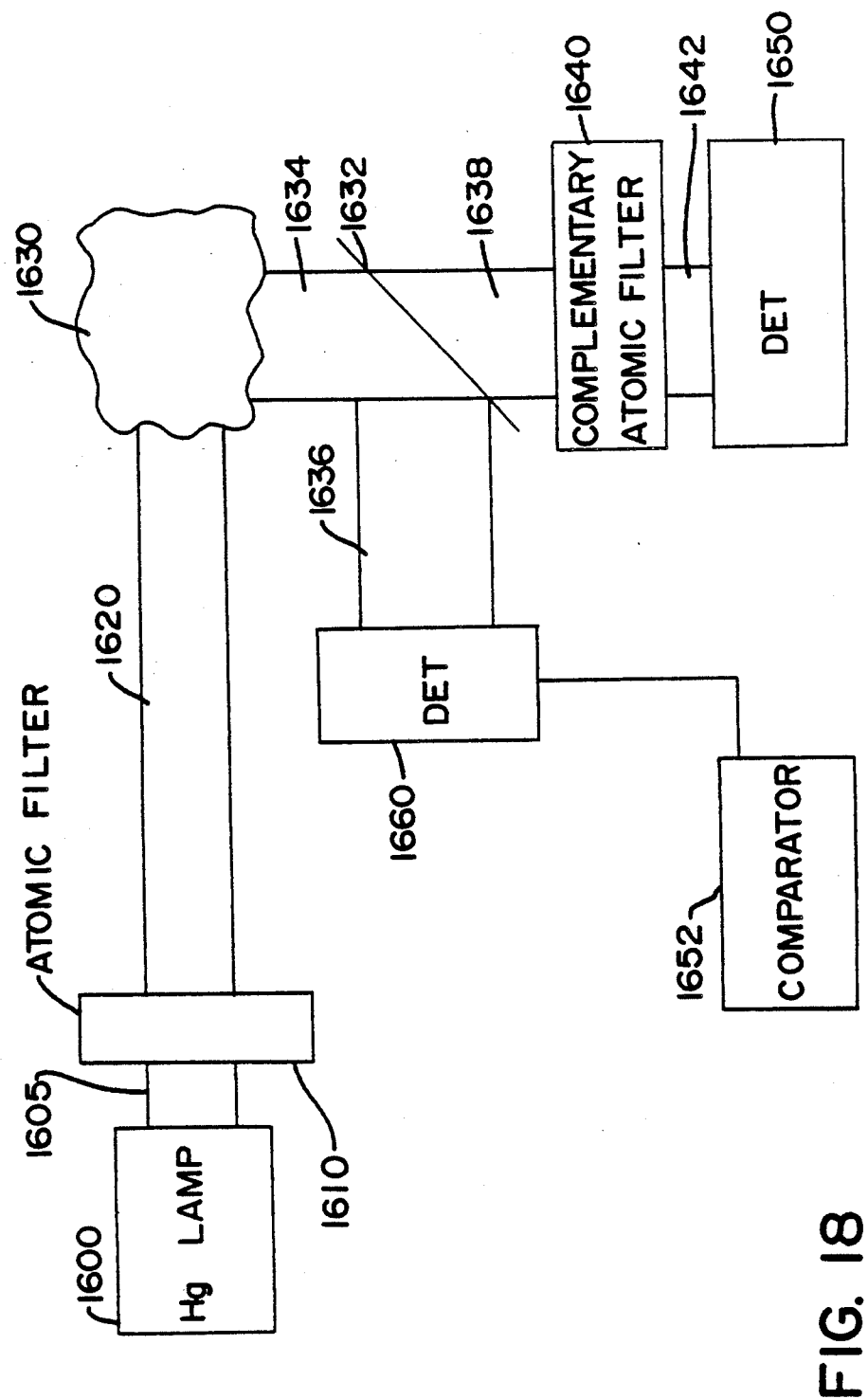
FIG. 18 is a block diagram of yet another embodiment of the invention.

An example of the above use of a lamp light source is shown in FIG. 18, where light 1605 from the mercury lamp 1600 passes through the filter 1610, which contains all stable isotopes of mercury including "mercury 198" and "mercury 202", but not "mercury 200". The narrow linewidth output light 1620 is then directed into the flowing gas 1630. A beam splitter 1632 receives scattered light 1634, and directs a portion 1636 to a reference detector 1660, and a portion 1638 downward to a filter or cell 1640.

Scattered light is collected through a mercury filter 1640 containing only "mercury 200". This filter 1640 blocks direct scattering of light from the mercury lamp, but will pass light 1638 which has been shifted by the thermal and directed motion of the gas in the scattering volume. Once again, the passed light 1642 is imaged onto a detector or detector array 1650. Simultaneously, a reference light image 1636 is detected by detector 1660 without a filter. The two images detected by detectors 1650 and 1660 are compared, via comparator 1652, to determine flow velocity and temperature. A similar arrangement can be accomplished with a sodium lamp and a sodium based filter, for example. The mercury lamp 1600 will be particularly appropriate for observing scattering from gas molecules such as air since the Rayleigh scattering cross-section is very large in the ultraviolet region. On the other hand, a sodium lamp will be particularly appropriate for observing particle scattering since it operates in the orange region of the spectrum at 589 nm.

Figure 19:
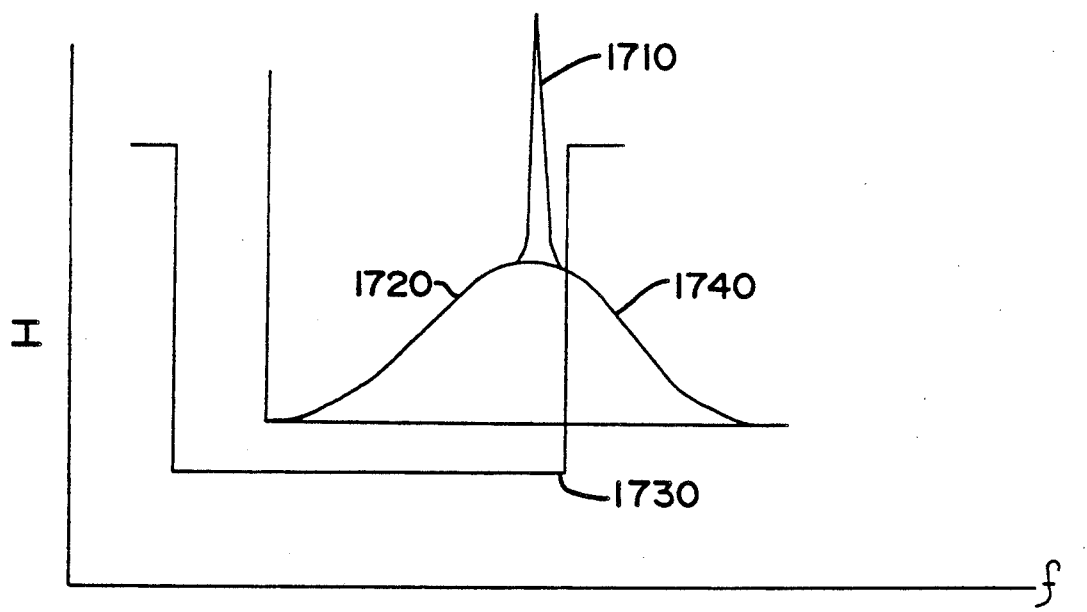
FIG. 19 shows a curve of the molecular scattering profile and the particle scattering profile for one embodiment of the invention.

Scattering from particles, such as from naturally occurring dust or fog in air, is substantially different from scattering from gas molecules. Due to their large mass, the thermal motion of the particles is negligible, so a narrow linewidth source generates narrow linewidth scattering whose frequency is displaced by the particle motion. Since scattering occurs from both particles and from gas molecules, the particle scattering is seen to be as a sharp peak 1710 on top of the molecular scattering profile 1720, as shown in FIG. 19. A sharp cutoff filter 1730 may be used to eliminate particle scattering by tuning the associated laser, for example, so that the light scattered from particles is absorbed by the filter. In that case, the Rayleigh scattering "tail" of the curve 1740 passes through the filter so that Rayleigh scattering can be observed even in the presence of large particle densities.

Figure 20:
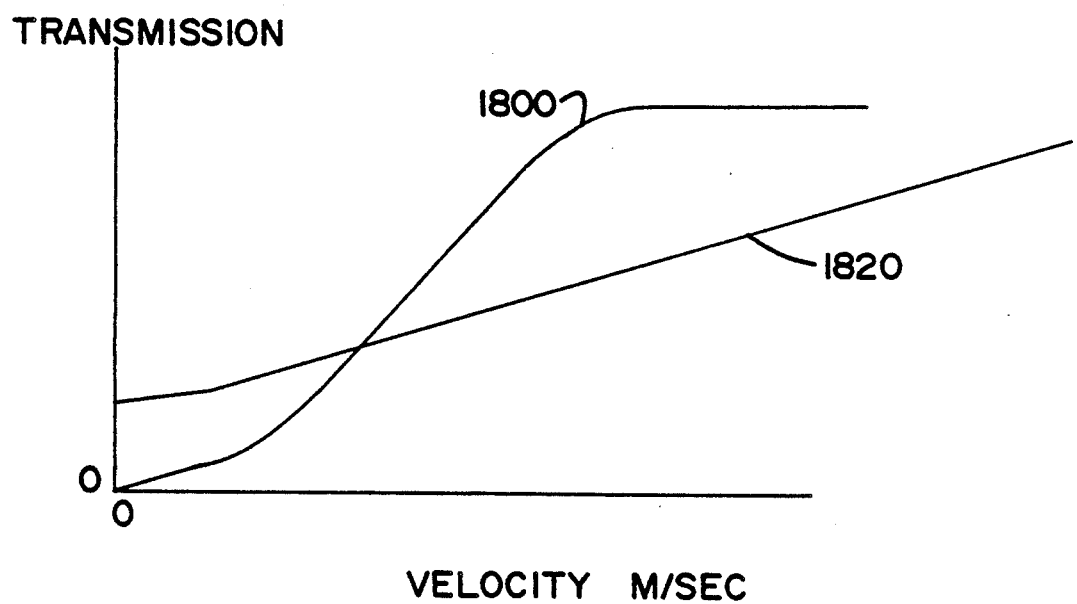
FIG. 20 shows a curve of detected signal transmission versus velocity for one embodiment of the invention.

By using the same apparatus shown in FIG. 17, and carefully tuning the laser 1500 to the frequency where particle scattering is cutoff, the velocity of the particles can be determined from the laser frequency. This becomes an alternate way of measuring velocity fields if the scattering is dominated by particle scattering. If a lamp source is used rather than a laser, such as shown in the example of FIG. 18, the particle scattering will be broadened by the linewidth of the lamp and the transmission through an associated sharp cutoff filter will be a function of the velocity. In this manner, velocity fields of moving particles can be recorded with a light source and a detector observing the flow field through a sharp cutoff filter. Assuming the light source is a mercury lamp 1600 passing through a narrow linewidth, optically thick filter 1610 with all isotopes except mercury 200 in front of it, as shown in FIG. 18, then the spectral output of the lamp 1600 will have a width between 1.0 and 2.0 GHz. The light scattered from particles will have the same width, but will be shifted by the Doppler shift associated with the particle motion. If the light is passed through a sharp cutoff atomic mercury filter 1640 containing only mercury 200, then the detected signal as a function of velocity will be a monotonic function of velocity 1800, as shown in FIG. 20. If the same lamp and filter combination is used to observe molecular Rayleigh scattering from air, the curve is broadened due to the thermal motion and Brillouin scattering of the air molecules. An example is shown as curve 1820 in FIG. 20.

Various embodiments of the invention have been described above for purposes of illustration. However, such embodiments are not meant to be limiting, and those of ordinary skill in the art may recognize ways to modify such embodiments without departing from the fundamental concept of the invention, or departing from the spirit and scope of the appended claims. The appended claims are meant to cover such modifications.

What is claimed is:

1. An apparatus for using light scattering for measuring the relative velocity between a source of light and a scattering region or volume located a distance in space from said source of light, wherein air molecules and/or particles within the scattering region or volume substantially provide scattering of the light, said apparatus comprising:

light source means for providing a beam of light of a predetermined frequency and linewidth, said beam being directed into a scattering region a distance from said light source means, for scattering said beam of light;

at least a first substantially non-linear absorption line filter window means positioned for receiving scattered light from said scattering region, and passing therethrough a substantial portion of the scattered light shifted in frequency by the Doppler effect beyond the filter cutoff frequency;

a first light detector positioned relative to said filter window means, for receiving unabsorbed portions of said scattered light from said filter window means to provide a first output signal indicative of the scattering intensity of said unabsorbed scattered light;

light reference calibrator means for calibrating the said absorption filter window means, for providing a reference signal as a second output signal; and signal processing means for receiving and comparing said second output signal to said first output signal, for providing an output signal proportional to the relative velocity between said light source means and said scattering region.

2. The apparatus of claim 1, wherein said light reference calibrator means includes:

at least a first beam splitter means positioned for receiving scattered light from said scattering region, for separating the received scattered light into first and second beams of scattered lights, said first beam being directed to said first absorption line filter window means; and a second light detector positioned relative to said beam splitter means, for receiving said second beam of light, to provide said second output signal.

3. The apparatus of claim wherein said light source means consists of a narrow linewidth laser source.

4. The apparatus of claim 1, wherein said light source means consists of a narrow linewidth laser source for producing a beam of light at 532.0 nm.

5. The apparatus of claim 3, wherein said absorption line filter window means consists of an absorption line filter window containing iodine vapor.

6. The apparatus of claim 5, wherein said laser source consists of an injection-locked Nd:YAG laser tuned to provide that the frequency of the laser source substantially overlaps one of the strong absorption lines in iodine vapor.

7. The apparatus of claim 3, wherein said absorption line filter window means has at least one absorption line substantially near the frequency of said beam of light from said laser source, whereby a substantial portion of the scattered light at said predetermined frequency is absorbed or attenuated by said filter window means.

8. The apparatus of claim 2, wherein for measuring velocity using particle scattering of light, said beam splitter means is positioned in a vertical plane intercepting the path of said beam of light within and through said scattering region at substantially a right angle, said second light detector is positioned in a horizontal plane in common with said beam splitter means, and at substantially ninety degrees to said vertical plane, and said absorption line filter means and said first light detector are positioned in said vertical plane on the side of said beam splitter means away from said particle scattering region.

9. The apparatus of claim 2, wherein said first and second detectors each consist of imaging detectors.

10. The apparatus of claim 1, wherein said light source means has its predetermined frequency tuned away from an atomic or molecular vapor absorption line peak of said absorption line filter window means, for optimizing the response of said apparatus to expected velocities to be measured.

11. The apparatus of claim 10, wherein the frequency of said light source means is chosen to be at the cutoff frequency of said absorption line filter window means, for permitting both positive and negative velocities to be measured.

12. The apparatus of claim 1, further including:

a collection mirror positioned near said light source means; and means for passing a light beam from said light source means to illuminate small particles in said scattering volume, whereby light backscattered from said particles is reflected off of said collection mirror onto said beam splitter means.

13. The apparatus of claim 1, wherein said absorption line filter window means consists of an atomic or molecular gas having predetermined absorption upper and lower sharp cutoff frequencies within an absorption filter window, and said light source means is tuned for setting the predetermined frequency of said beam of light between said upper and lower sharp cutoff frequencies for said absorption filter window, thereby optimizing the response of said output signal for said relative velocity.

14. The apparatus of claim 12, wherein said light source means consists of a pulsed narrow linewidth laser, thereby permitting detection of the backscattered light as a function of time, whereby the level of transmission is constant for relatively constant apparent motion of a gas within said scattering region, and the level abruptly changes for providing a measure of the magnitude and distance of a velocity component of turbulent gas within said scattering region, such as caused by clear air turbulence.

15. The apparatus of claim 1, for scattering light from air molecules via Rayleigh scattering, wherein said absorption line filter window means consists of an absorption line filter window filled with an absorbing atomic or molecular gas.

16. The apparatus of claim 3, wherein said laser source is a frequency tripled Alexandrite laser providing a laser beam having a frequency substantially near the absorption line of mercury vapor, and said filter window is filled with mercury vapor.

17. The apparatus of claim 15, wherein said laser source is a frequency tripled titanium sapphire laser providing a laser beam having a frequency substantially near the absorption line of mercury vapor, and said filter window is filled with mercury vapor.

18. The apparatus of claim 1, further including:
a plurality of said absorption line filter window means each receiving scattered light, including said first absorption line filter window means;
a plurality of light detectors, including said first light detector, each receiving transmitted light from an associated one of said plurality of light filter window means; and
said plurality of absorption line filter window means each having different linewidths or absorption line centers, respectively for producing different transmission spectra as a function of the measured relative velocity, transmission measurements from at least two of said absorption line filter window means being used to determine the relative velocity and of molecules within said scattering region or volume.

19. The apparatus of claim 1, wherein said filter window means further includes blocking means for blocking portions of the scattered light derived from non-moving elements in and around said scattering region.

20. The apparatus of claim 1, further including:
said light source means consisting of a narrow linewidth laser source of light, for projecting a beam of light into a scattering region or volume including molecules for causing Rayleigh scattering of said light beam;
said light reference calibrator means including
beam splitter means located between said laser and said scattering volume, the latter being a distance from said laser, for directing a first portion of said laser beam away from the main path of the latter, and a second absorption line filter window means identical to said first absorption line filter window means;
said second filter window means being positioned for receiving said first portion of said beam from said beam splitter means; and
a second light detector positioned for receiving the beam passed through said second filter window means, said second detector serving as a reference detector for providing said second output signal.

21. The velocity measuring apparatus of claim 20, wherein said first and second absorption filter window cells are each filled with mercury vapor, and said laser is an ultraviolet laser.

22. A method for measuring velocity, comprising the steps of:
projecting a beam of light from a light source into a scattering volume containing molecules of gas and/or particles, for scattering said light beam;
separating scattered light from said scattering volume into first and second beams of light;
directly converting said first beam of light into a first output signal having a level proportional to the scattering intensity of said first beam of light;
passing said second beam of light through an absorption line filter window, for filtering the beam to obtain the portion of said second beam shifted in frequency by the Doppler effect beyond the cutoff frequency of the filter;
converting a Doppler shifted portion of said second beam into a second output signal having a level proportional to the scattering intensity of said second beam of light; and
comparing said first and second output signals to provide a signal proportional to the relative velocity between a source of said light beam and the molecules of gas and/or particles within said scattering volume.

23. The method of claim 22, wherein said projecting step includes the step of producing said beam of light at a wavelength of 532.0 nm.

24. The method of claim 23, wherein said filtering step includes the step of filling said absorption line filter window with iodine vapor.

25. The method of claim 24, wherein said light source consists of an injection-locked Nd:YAG laser, and said projecting step includes the step of tuning said laser, for making the frequency of said light beam overlap one of the strong absorption lines in iodine vapor.

26. The method of claim 22, wherein said step of projecting further includes the step of tuning said light source away from an atomic or molecular vapor absorption line peak of said filter window, for optimizing the response of said apparatus to expected velocities to be measured.

27. The method of claim 26, wherein said tuning step includes placing the frequency of said light beam substantially at the cutoff frequency of said absorption line filter window.

28. The method of claim 22, wherein said separating step further includes the step of intercepting light backscattered from said scattering volume for obtaining said first and second beams of light.

29. The method of claim 28, wherein said projecting step further includes pulsing said source of light to obtain a pulsed beam of light, for detecting backscattered light as a function of time, whereby the transmission signal through said absorption filter window remains relatively constant for constant apparent motion of particles within said scattering volume, whereby the level of said transmission signal abruptly changes with abrupt changes in the velocity component of said particles, providing detection of phenomena such as clear air turbulence.

30. The method of claim 22, wherein said light source consists of a narrow linewidth ultraviolet laser source, and said absorption line filter window is filled with an ultraviolet absorbing atomic or molecular gas, whereby said projecting step causes strong Rayleigh scattering of light from said scattering volume.

31. The method of claim 30, further including the step of measuring the temperature of molecules within said scattering volume by observing shifts in the transmission characteristics of said absorption line filter window.

32. The apparatus in claim 1, wherein said signal processing means includes a feedback loop controlling the frequency of said light source means, such that the ratio between said first light detector and said light reference calibration means remains constant, and further includes light source frequency measurement means to determine the difference in frequency between said first output signal and said second output signal corresponding to the relative velocity of said light source means relative to said scattering region.

33. The apparatus of claim 3, wherein said laser source is a frequency doubled narrow linewidth Nd:YAG laser providing a laser beam having a frequency substantially near one of the absorption lines of iodine vapor, and said filter window is filled with iodine vapor.

34. The apparatus of claim 1, wherein said light source means is a narrow linewidth fluorescence lamp.

35. The apparatus of claim 34, wherein said narrow linewidth fluorescence lamp consists of a mercury lamp.

36. The apparatus of claim 35, further including said mercury lamp having placed in front of it an isotopically selected mercury vapor absorption filter for further narrowing the frequency output of the lamp.

37. The apparatus of claim 1, wherein said filter window is filled with mercury vapor.

38. The apparatus of claim 35, wherein said filter window is filled with mercury vapor which has been isotopically selected to block the light from said mercury lamp, thereby providing an isotopically selected mercury vapor filter.

39. The apparatus of claim 1, wherein said filter window means further includes blocking means for blocking portions of the scattered light derived from non-moving elements in and around said scattering region.

40. An apparatus for using light scattering for measuring the relative velocity between a source of light and a scattering region or volume located a distance in space from said source of light, said apparatus comprising:
light source means for providing a beam of light of a predetermined frequency, said beam being directed into a scattering region a distance from said light source means, for scattering said beam of light;
at least a first absorption line filter window means positioned for passing therethrough scattered light from said scattering region, a portion of the scattered light shifted in frequency by the Doppler effect being passed through and unabsorbed by said filter window means in proportion to the magnitude of frequency shifting thereof from said predetermined frequency;
a first light detector positioned relative to said filter window means, for receiving unabsorbed portions of said scattered light passed through said filter window means to provide a first output signal indicative of the scattering intensity of said unabsorbed scattered light;
light reference calibrator means for calibrating said absorption filter window means, for providing a reference signal as a second output signal, wherein said light reference calibrator means includes at least a first beam splitter means positioned for receiving scattered light from said scattering region, for separating the received scattered light into first and second beams of scattered light, said first beam being directed to said first absorption line filter window means, and a second light detector positioned relative to said beam splitter means, for receiving said second beam of light, to provide said second output signal;
said beam splitter means being positioned in a vertical plane intercepting the path of said beam of light within and through said scattering region at substantially a right angle, said first light detector being positioned in a horizontal plane in common with said beam splitter means, and at substantially ninety degrees to said vertical plane, and said absorption line filter means and said second light detector being positioned in said vertical plane on the side of said beam splitter means away from said scattering region, for using molecular and/or particle scattering for measuring velocity; and
signal processing means for receiving and comparing said second output signal to said first output signal, for providing an output signal proportional to the relative velocity between said light source means and said scattering region.

41. The apparatus of claim 40, wherein said first and second detectors each consist of imaging detectors.

42. The apparatus of claim 40, wherein said light source means has its predetermined frequency tuned away from an atomic or molecular vapor absorption line peak of said absorption line filter window means, for optimizing the response of said apparatus to expected velocities to be measured.

43. The apparatus of claim 42, wherein the frequency of said light source means is chosen to be at the half-power transmission point of said absorption line filter window means, for permitting both positive and negative velocities to be measured.

44. The apparatus of claim 40, further including;
a collection mirror positioned near said light source means; and
means for passing a light beam from said light source means to illuminate small particles in said scattering volume, whereby light backscattered from said particles is reflected off of said collection mirror onto said beam splitter means.

45. The apparatus of claim 44, wherein said absorption line filter window means consists of an atomic or molecular gas having a predetermined absorption resonance contained within an absorption filter window, and said light source means is tuned for setting the predetermined frequency of said beam of light substantially near said predetermined absorption resonance for said absorption filter window, thereby making said output signal directly proportional to said relative velocity.

46. The apparatus of claim 44, wherein said light source means consists of a pulsed narrow linewidth laser, thereby permitting detection of the backscattered light as a function of time, whereby the level of transmission is constant for relatively constant apparent motion of a gas within said scattering region, and the level abruptly changes for providing a measure of the magnitude and distance of a velocity component of turbulent gas within said scattering region, such as caused by clear air turbulence.

47. The apparatus of claim 40, for scattering light from air molecules via Rayleigh scattering, wherein said light source means consists of a narrow linewidth laser source, and said absorption line filter window means consists of an absorption line filter window filled with an absorbing atomic or molecular gas.

48. The apparatus of claim 47, wherein said laser source is a frequency tripled Alexandrite laser providing a leaser beam having a frequency substantially near the absorption line of mercury vapor, and said filter window is filled with mercury vapor.

49. The apparatus of claim 47, wherein said laser source is a frequency tripled titanium sapphire laser providing a laser beam having a frequency substantially near the absorption line of mercury vapor, and said filter window is filled with mercury vapor.

50. The apparatus of claim 40, for scattering light from air molecules via Rayleigh scattering, further including:
   said light source means consisting of a narrow linewidth laser source;
   said absorption line filter window means consisting of an absorption line filter window filled with an absorbing atomic or molecular gas;
   a plurality of said absorption line filter window means each receiving scattered light, including said first absorption line filter window means;
   a plurality of light detectors, including said first light detector, each receiving transmitted light from an associated one of said plurality of light filter window means; and
   said plurality of absorption line filter window means each having different linewidths or absorption line centers, respectively for producing different transmission spectra as a function of the measured relative velocity, transmission measurements from at least two of said absorption line filter window means being used to determine both the relative velocity and temperature of molecules within said scattering region or volume.

51. The apparatus of claim 40, wherein said filter window means includes blocking means for blocking portions of the scattered light derived from non-moving elements in and around said scattering region.

52. The apparatus of claim 40, further including:
   said light source means consisting of a narrow linewidth laser source of light, for projecting a beam of light into a scattering region or volume including molecules for causing Rayleigh scattering of said light beam;
   said light reference calibrator means including beam splitter means located between said laser and said scattering volume, the latter being a distance from said laser, for directing a first portion of said laser beam away from the main path of the latter, and a second absorption line filter window means identical to said first absorption line filter window means;
   said second filter window means being positioned for receiving said first portion of said beam from said beam splitter means; and
   a second light detector positioned for receiving the beam passed through said second filter window means, said second detector serving as a reference detector for providing said second output signal.

53. The velocity measuring apparatus of claim 52, wherein said first and second absorption filter window cells are each filled with mercury vapor, and said laser is an ultraviolet laser.

* * * * *

UNITED STATES PATENT AND TRADEMARK OFFICE
CERTIFICATE OF CORRECTION

PATENT NO. : 4,988,190

DATED : January 29, 1991

INVENTOR(S) : Richard B. Miles

It is certified that error appears in the above-identified patent and that said Letters Patent is hereby corrected as shown below:

Column 15, Line 34, change "15" to --3--.

Column 15, Line 54, delete "and".

Signed and Sealed this

Twenty-third Day of June, 1992

Attest:

DOUGLAS B. COMER

*Attesting Officer*  *Acting Commissioner of Patents and Trademarks*